(12) United States Patent
Anderson

(10) Patent No.: US 10,800,339 B2
(45) Date of Patent: Oct. 13, 2020

(54) VEHICLE RACK ASSEMBLY AND RACK ACCESSING METHOD

(71) Applicant: Ford Global Technologies, LLC, Dearborn, MI (US)

(72) Inventor: Ronald Lowell Anderson, Newport Beach, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/161,451

(22) Filed: Oct. 16, 2018

(65) Prior Publication Data
US 2020/0114830 A1 Apr. 16, 2020

(51) Int. Cl.
| B60R 9/04 | (2006.01) |
| B60R 9/042 | (2006.01) |
| B60R 9/045 | (2006.01) |
| B60R 9/055 | (2006.01) |
| B60R 9/058 | (2006.01) |

(52) U.S. Cl.
CPC .............. *B60R 9/042* (2013.01); *B60R 9/045* (2013.01); *B60R 9/055* (2013.01); *B60R 9/058* (2013.01)

(58) Field of Classification Search
CPC ..... B60R 9/042; B60R 9/0423; B60R 9/0426; B60R 9/045; B60R 9/055; B60R 9/058
See application file for complete search history.

(56) References Cited

U.S. PATENT DOCUMENTS

| 3,777,922 | A | * | 12/1973 | Kirchmeyer | .......... | B60P 3/1016 |
| | | | | | | 414/462 |
| 6,516,984 | B1 | * | 2/2003 | Kmita | ..................... | B60R 9/042 |
| | | | | | | 224/309 |
| 7,226,266 | B2 | | 6/2007 | Henderson et al. | | |
| 7,513,730 | B2 | | 4/2009 | Goyanko | | |
| 8,322,580 | B1 | | 12/2012 | Hamilton | | |
| 8,640,933 | B1 | | 2/2014 | McCray | | |
| 9,346,389 | B2 | | 5/2016 | Ferkul | | |
| 9,731,659 | B2 | | 8/2017 | Goldberg | | |
| 9,914,400 | B1 | | 3/2018 | Johnsrud | | |
| 10,059,273 | B1 | | 8/2018 | Mercurio | | |
| 2007/0090139 | A1 | | 4/2007 | McKenzie | | |
| 2011/0038698 | A1 | | 2/2011 | Li | | |
| 2017/0274810 | A1 | | 9/2017 | Zerbst et al. | | |

FOREIGN PATENT DOCUMENTS

CA        2850570        11/2015

* cited by examiner

*Primary Examiner* — Corey N Skurdal
(74) *Attorney, Agent, or Firm* — David Coppiellie, Esq.; Carlson, Gaskey & Olds. P.C.

(57) ABSTRACT

A rack assembly includes, among other things, a cargo frame, a cantilever frame, and an actuation system that moves the cargo frame from a stowed position to an intermediate position by sliding the cargo and cantilever frames relative to an anchor frame. The actuation system moves the cargo frame from the intermediate position by sliding the cargo frame relative to the cantilever frame to permit pivoting of the cargo frame relative to the cantilever frame to a loading position. A rack accessing method includes, among other things, sliding a cargo frame and a cantilever frame relative to an anchor frame to move the cargo frame from a stowed position to an intermediate position. The method further includes sliding the cargo frame relative to the cantilever frame to permit pivoting the cargo frame relative to the cantilever frame to move the cargo frame from the intermediate position to a loading position.

19 Claims, 11 Drawing Sheets

VEHICLE RACK ASSEMBLY AND RACK ACCESSING METHOD

TECHNICAL FIELD

This disclosure relates generally to a rack assembly for a vehicle and, more particularly, to a rack assembly that can move between a stowed position and a loading position.

BACKGROUND

Racks can be mounted to a vehicle. The racks can support cargo, such as bikes, boats, storage boxes, snowboards, etc., as the vehicle is driven. Some racks mount to vehicle roofs. Other racks mount to vehicle cargo beds.

Raising cargo to the rack and lowering cargo from racks can be challenging. Further, if the vehicle with the rack is parked in a congested area, such as between other vehicles within a parking lot, access to the rack for loading and unloading cargo may be blocked.

SUMMARY

A rack assembly according to an exemplary aspect of the present disclosure includes, among other things, a cargo frame, a cantilever frame, and an actuation system that moves the cargo frame from a stowed position to an intermediate position by sliding the cargo and cantilever frames relative to an anchor frame. The actuation system further moves the cargo frame from the intermediate position by sliding the cargo frame relative to the cantilever frame to permit pivoting of the cargo frame relative to the cantilever frame to a loading position.

In another non-limiting embodiment of the foregoing rack assembly, the anchor frame is secured directly to roof rails of a vehicle.

In another non-limiting embodiment of the any of foregoing rack assemblies, the anchor frame is instead secured directly to a cargo bed of a vehicle.

In another non-limiting embodiment of any of foregoing rack assemblies, the cargo frame is configured to support cargo such that the cargo is coupled in movement together with the cargo frame.

Another non-limiting embodiment of any of foregoing rack assemblies includes cables of the actuation system. The cables slide the cargo frame when moving the cargo frame from the stowed position to the loading position.

Another non-limiting embodiment of any of foregoing rack assemblies includes a lock assembly that transitions between an unlocked position and a locked position. The lock assembly in the unlocked position permits movement of the cantilever frame relative to the anchor frame as the cargo frame is moved from the stowed position to the intermediate position. The lock assembly in the locked position blocks movement of the cantilever frame relative to the anchor frame as the cargo frame is moved from the intermediate position to the loading position.

In another non-limiting embodiment of any of foregoing rack assemblies, the lock assembly includes a latch that pivots in response to movement of the cantilever frame relative to the anchor frame. The pivoting transitions the lock assembly between the unlocked position and the locked position. The latch is withdrawn from a notch when the lock assembly is in the unlocked position. The latch is at least partially received within the notch when the lock assembly is in the locked position.

Another non-limiting embodiment of any of foregoing rack assemblies includes a first cable, a second cable, and an actuator, of the actuation system. The actuator is configured to move the first cable to slide a first rail of the cargo frame and a first rail of the cantilever frame when moving the cargo frame from the stowed position to the loading position. The actuator is configured to move the second cable to slide a second rail of the cargo frame and a second rail of the cantilever frame when moving the cargo frame from the stowed position to the loading position.

In another non-limiting embodiment of any of foregoing rack assemblies, the actuator is a motor configured to rotate drive rods to move both the first and the second cables.

In another non-limiting embodiment of any of foregoing rack assemblies, the motor is disposed between the first rails and the second rails of the cargo and cantilever frames.

In another non-limiting embodiment of any of foregoing rack assemblies, the actuation system moves the cargo frame from the loading position to the intermediate position by sliding the cargo frame relative to the cantilever frame and by pivoting the cargo frame relative to the cantilever frame. The actuation system moves the cargo frame from the intermediate position to the stowed position by sliding the cargo and cantilever frames relative to the anchor frame.

In another non-limiting embodiment of any of foregoing rack assemblies, sliding the cargo and cantilever frames relative to the anchor frame to move the cargo frame from a stowed position to an intermediate position extends an end portion of the cargo frame away from the anchor frame. Pivoting the cargo frame when moving the cargo frame from the intermediate position to the loading position moves the end portion of the cargo frame vertically downward.

A rack accessing method according to another exemplary aspect of the present disclosure includes, among other things, sliding a cargo frame and a cantilever frame relative to an anchor frame to move the cargo frame from a stowed position to an intermediate position. The method further includes sliding the cargo frame relative to the cantilever frame to permit pivoting the cargo frame relative to the cantilever frame to move the cargo frame from the intermediate position to a loading position.

In a further non-limiting embodiment of the foregoing method, the anchor frame is secured to a vehicle during the sliding.

A further non-limiting embodiment of any of the foregoing methods includes supporting cargo with the cargo frame such that the cargo moves with the cargo frame between the stowed and loading positions.

A further non-limiting embodiment of any of the foregoing methods includes sliding the cargo frame using a cable drive system.

A further non-limiting embodiment of any of the foregoing methods includes using a motor to drive a first cable to slide a first rail of the cargo frame and a first rail of the cantilever frame when moving the cargo frame from the stowed position to the loading position, and using the motor to drive a second cable to slide a second rail of the cargo frame and a second rail of the cantilever frame when moving the cargo frame from the stowed position to the loading position.

A further non-limiting embodiment of any of the foregoing methods includes moving the cargo frame from the loading position to the intermediate position by sliding the cargo frame relative to the cantilever frame and pivoting the cargo frame relative to the cantilever frame, and moving the cargo frame from the intermediate position to the stowed position by sliding the cargo and cantilever frames relative to the anchor frame.

A further non-limiting embodiment of any of the foregoing methods includes extending an end portion of the cargo frame away from a vehicle when sliding the cargo and cantilever frames relative to the anchor frame to move the cargo frame from a stowed position to an intermediate position, and moving the end portion of the cargo frame vertically downward when pivoting the cargo frame.

A further non-limiting embodiment of any of the foregoing methods includes moving the cargo frame relative to the anchor frame to transition a lock assembly from an unlocked position to a locked position. The lock assembly in the unlocked position permits movement of the cantilever frame relative to the anchor frame as the cargo frame is moved from the stowed position to the intermediate position. The lock assembly in the locked position blocks movement of the cantilever frame relative to the anchor frame as the cargo frame is moved from the intermediate position to the loading position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a rack assembly for a vehicle. The rack assembly includes an actuation system that transitions the rack assembly back and forth between a stowed position and a loading position. In the stowed position, the rack assembly can support cargo as the vehicle is driven. In the loading position, the rack assembly can be accessed such that cargo can be loaded or unloaded from the rack assembly.

Figure 1:
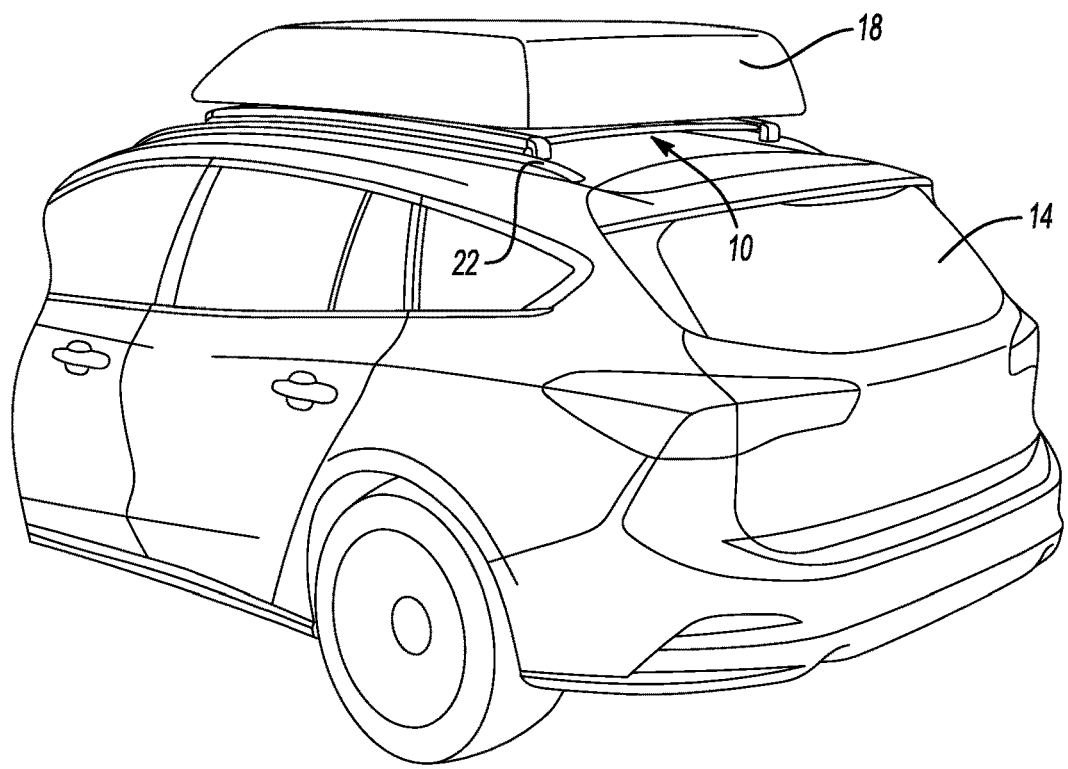
FIG. 1 illustrates a perspective view of a rack assembly mounted to a vehicle in a stowed position and carrying cargo.
Figure 2:
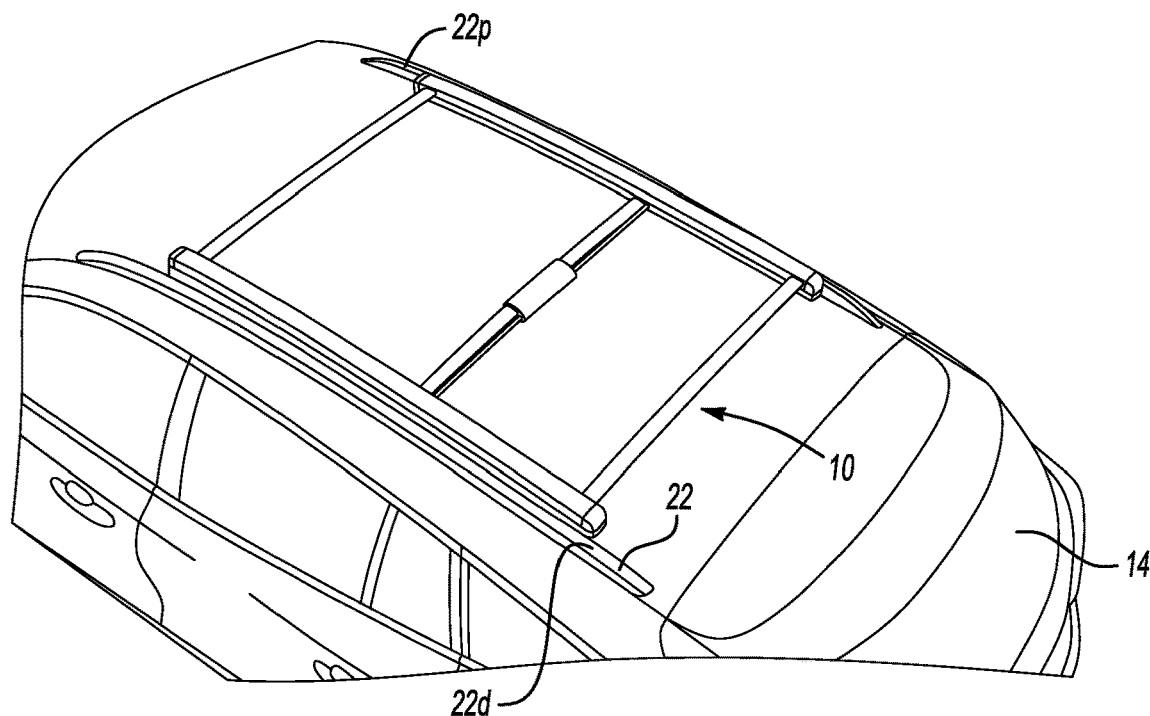
FIG. 2 illustrates a top perspective view of the rack assembly of FIG. 1 mounted to the vehicle and with the cargo removed.

With reference to FIGS. 1 and 2, a rack assembly 10 is mounted to a vehicle 14. The rack assembly 10 can support cargo 18, which is a cargo box in this example. In other examples, the cargo supported by the rack assembly 10 could include other types of storage boxes, bikes, boats (kayaks and canoes), boards (snow and water), or some other type of cargo securable to the rack assembly 10.

In this exemplary embodiment, the rack assembly 10 is directly secured to roof rails 22 of the vehicle 14. The cargo 18 is mounted to the rack assembly 10 such that the cargo 18 is supported by the vehicle 14 through the rack assembly 10.

In the position of FIGS. 1 and 2, the rack assembly 10 in a stowed position. In the stowed position, the vehicle 14 can be driven with the rack assembly 10 supporting the cargo 18.

As can be appreciated, loading cargo 18 onto the rack assembly 10 and unloading cargo 18 from the rack assembly 10 can be challenging when the rack assembly 10 in the stowed position. This can be due to, among other things, the vertical height of the rack assembly 10, the proximity of the vehicle 14 to nearby obstacles, such as other cars, or some combination of these. Accordingly, the rack assembly 10 can move to from the stowed position of FIGS. 1 and 2 to a loading position where the cargo 18 can be more easily loaded onto the rack assembly 10 or unloaded from the rack assembly 10.

Figure 3:
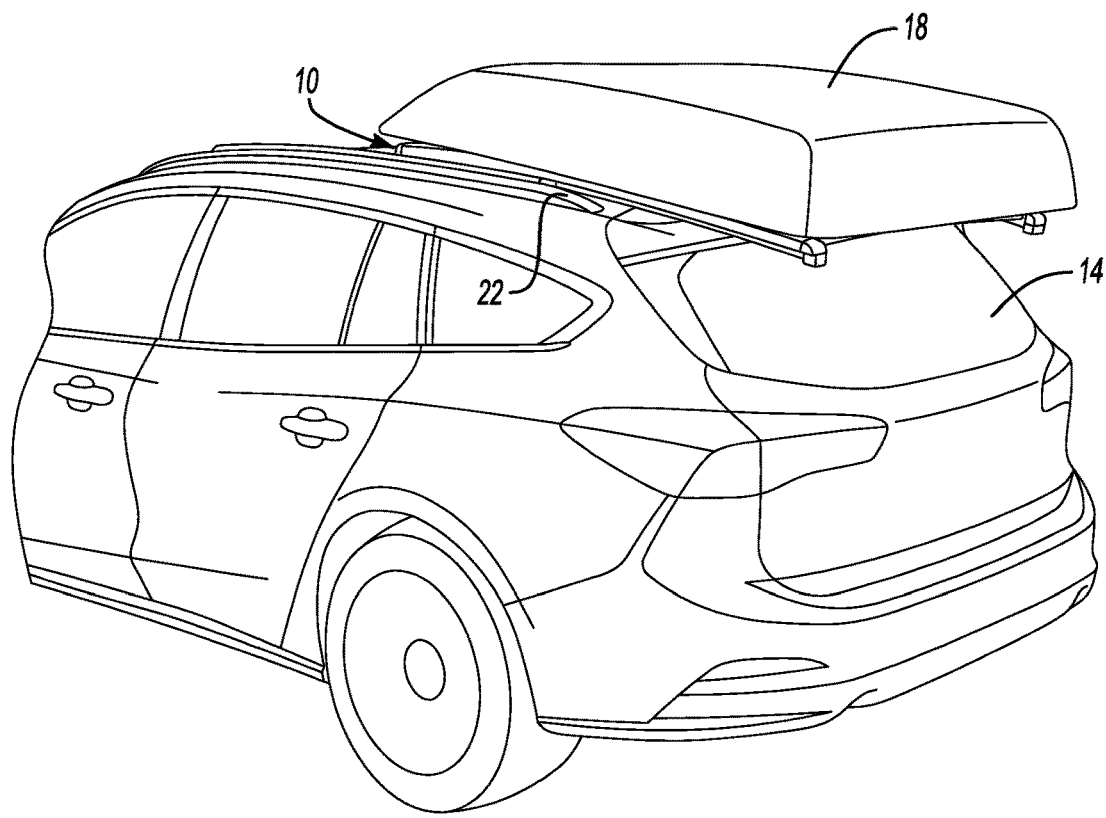
FIG. 3 illustrates the rack assembly of FIG. 1 transitioned from a stowed position to an intermediate position.
Figure 4:
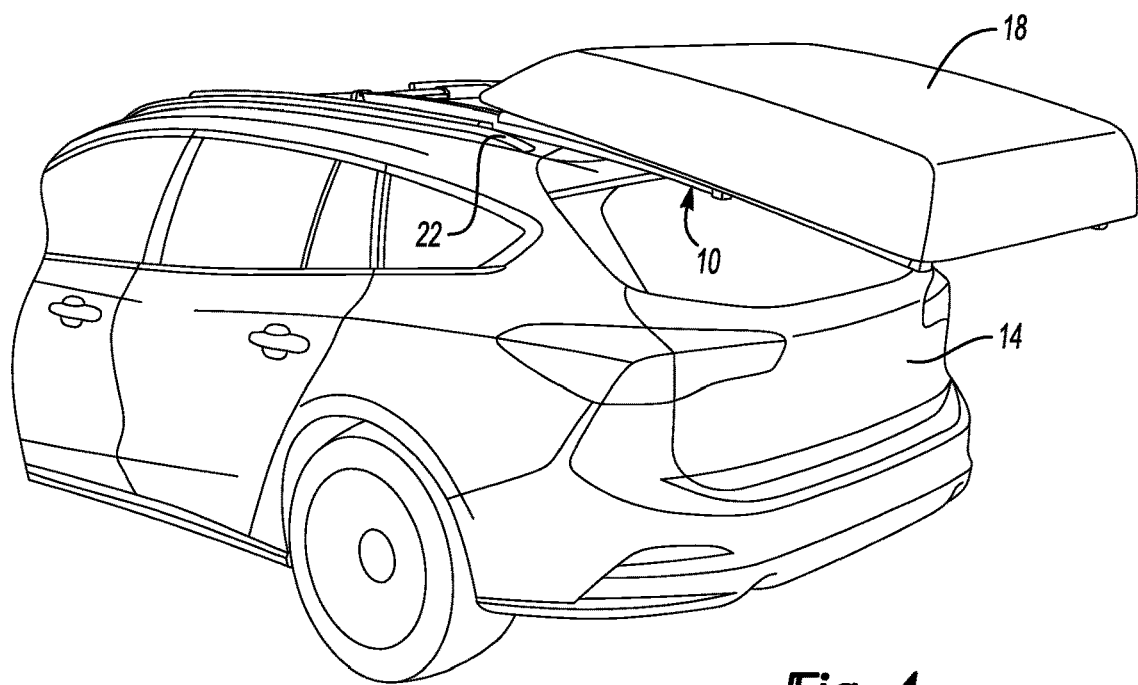
FIG. 4 illustrates the rack assembly of FIG. 3 transitioned from the intermediate position closer to a loading position.
Figure 5:
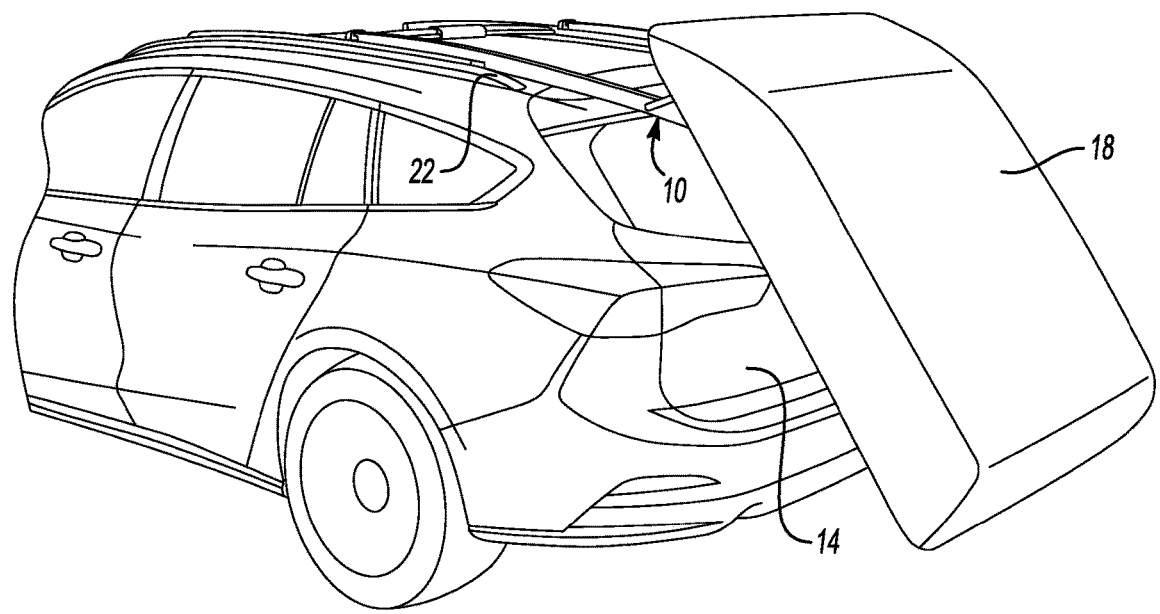
FIG. 5 illustrates the rack assembly of FIG. 4 in a loading position.

In this exemplary non-limiting embodiment, the rack assembly 10 can move from the stowed position of FIGS. 1 and 2, to an intermediate position shown in FIG. 3, and then transition through the position shown in FIG. 4 to the loading position shown in FIG. 5. In the loading position, the cargo 18, here the cargo box, can be opened to place items within the cargo box. Further, the cargo 18 can be demounted from the rack assembly 10 while a user is standing on the ground.

With reference now to FIGS. 2 and 6-9, the rack assembly 10 in this exemplary non-limiting embodiment, includes a cargo frame 30, a cantilever frame 34, an anchor frame 38, and an actuation system 42. The cargo frame 30 can be considered a top frame, the cantilever frame 34 a mid-frame, and the anchor frame 38 a bottom frame in some examples.

The anchor frame 38 is directly secured to the roof rails 22 when the rack assembly 10 is mounted to the vehicle 14. Mechanical fasteners and/or clamps, for example, could be used to secure the anchor frame 38 directly to the roof rails 22.

The anchor frame 38 includes, in this example, a driver side rail 46d and a passenger side rail 46p. The driver side rail 46d is secured directly to a corresponding driver side roof rail 22d when the rack assembly 10 is mounted to the vehicle 14. The passenger rail 46p is secured directly to a corresponding passenger side roof rail 22p when the rack assembly 10 is mounted to the vehicle 14. The driver side rail 46d and passenger side rail 46p could be extruded metals or metal alloys.

The driver side rail 46d and passenger side rail 46p are configured to attach to the roof rails 22d, 22p without substantial modifications to the roof rails 22d, 22p. The driver side rail 46d and passenger side rail 46p can be secured to the roof rails 22d, 22p such that the roof rails 22d, 22p hide some or all of the cargo frame 30 when the vehicle 14 is viewed from the side. This can minimize the visual impact associated with attaching the cargo frame 30 to the vehicle 14.

The cargo frame 30, in this example, is the portion of the rack assembly 10 that directly supports the cargo 18. The cargo 18 can be secured to the cargo frame 30 of the rack assembly 10 using clamps, mechanical fasteners, or some other attachment device.

When the cargo 18 is secured to the rack assembly 10, the cargo 18 moves together with the cargo frame 30 as the rack assembly 10 transitions between the stowed position and the loading position.

The cargo frame 30 includes a driver side rail 50d, a passenger side rail 50p, a front cross member 54f, and a rear cross member 54r. The cargo 18 can be secured to or otherwise supported by the driver side rail 50d, the passenger side rail 50p, the front cross member 54f, the rear cross member 54r, or some combination of these. The driver side rail 50d and passenger side rail 50p could be extruded metals or metal alloys.

The cantilever frame 34 couples together the cargo frame 30 and the anchor frame 38. The cantilever frame 34 is slidably engaged with the anchor frame 38. The cargo frame 30 is slidably engaged with the cantilever frame 34. Further, the cargo frame 30 is pivotably coupled to the cantilever frame 34.

The cantilever frame 34, in this exemplary non-limiting embodiment, includes a driver side rail 58d and a passenger side rail 58p. The driver side rail 50d and passenger side rail 50p could be extruded metals or metal alloys.

Figure 6:
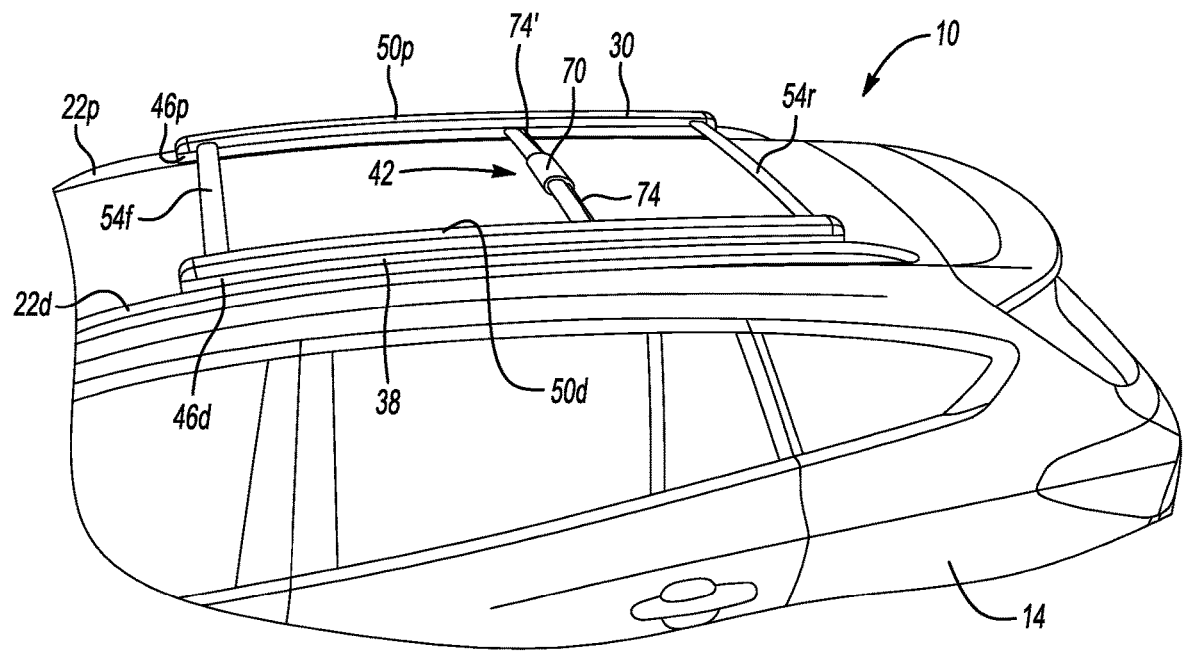
FIG. 6 illustrates another perspective view of the rack assembly in the stowed position of FIGS. 1 and 2, but with the cargo removed.
Figure 7:
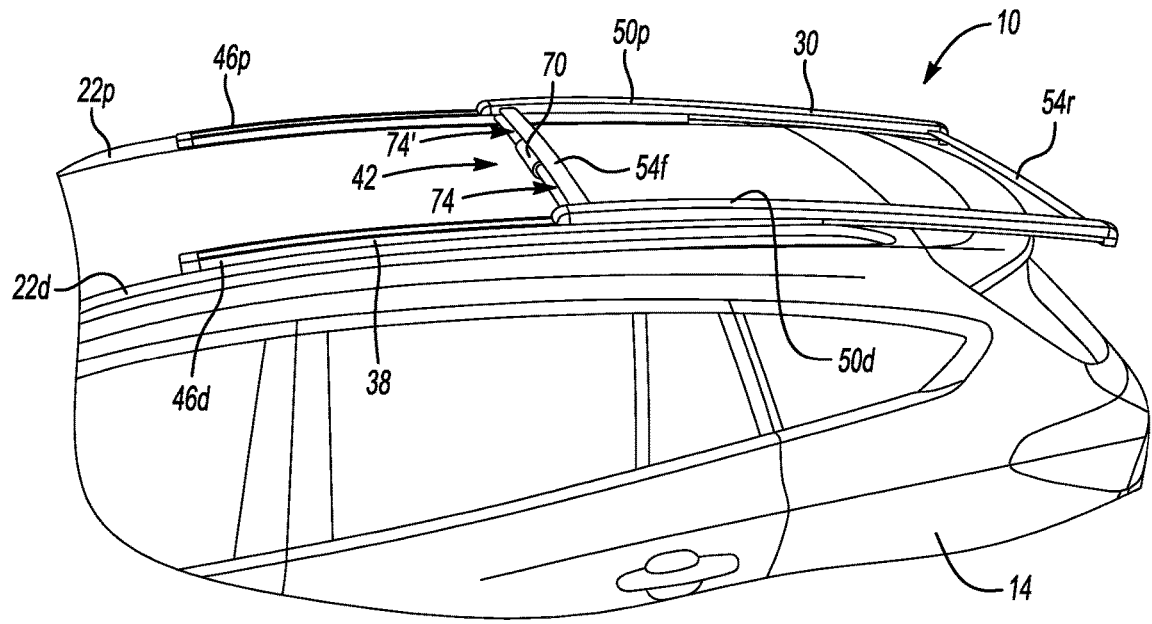
FIG. 7 illustrates the rack assembly of FIG. 6 transitioned to the intermediate position of FIG. 3.
Figure 8:
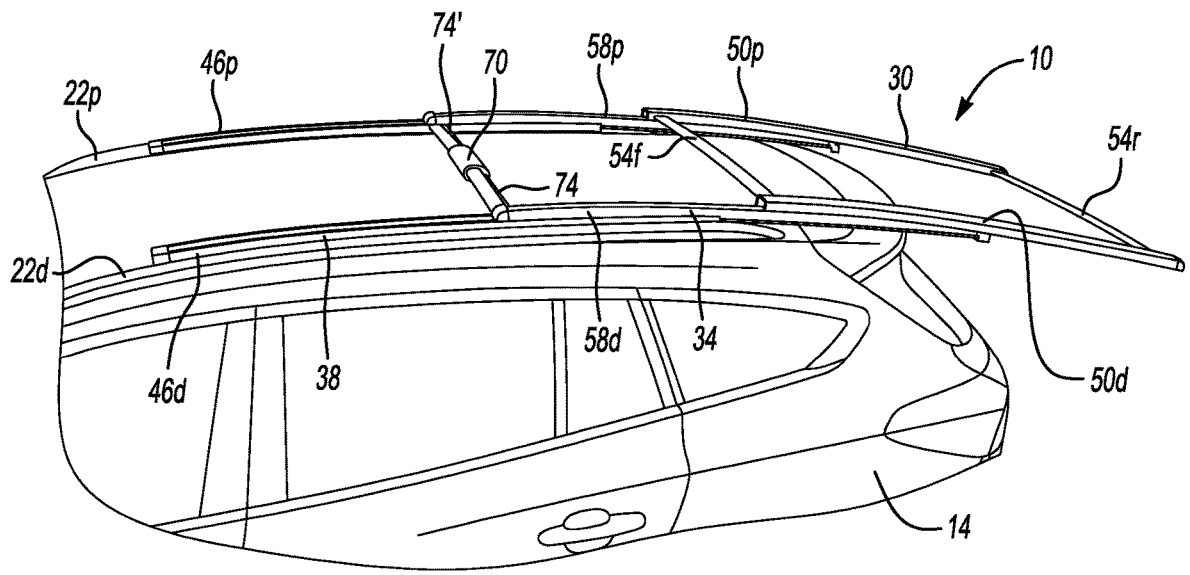
FIG. 8 illustrates the rack assembly of FIG. 6 transitioned to the position of FIG. 4, which is between the intermediate position and the loading position.
Figure 9:
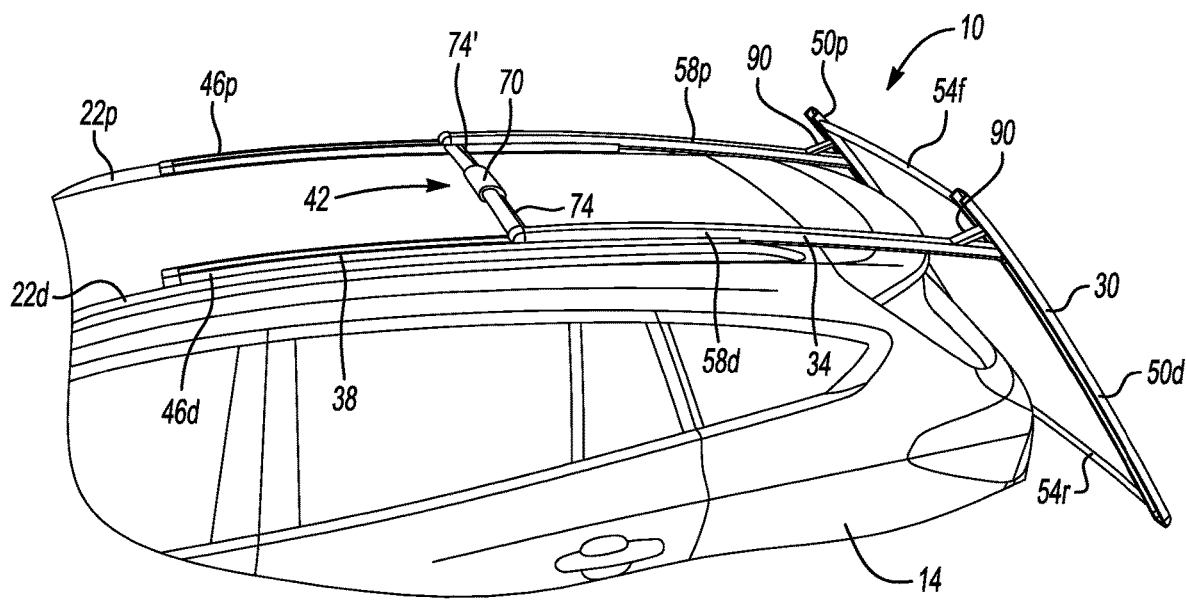
FIG. 9 illustrates the perspective view of the rack assembly of FIG. 6 when the rack assembly is in the loading position of FIG. 5.

To transition the rack assembly 10 from the stowed position of FIG. 6 to the loading position of FIG. 9, the actuation system 42 first slides the cargo frame 30 and the cantilever frame 34 relative to the anchor frame 38 until the cargo frame 30 and the cantilever frame 34 are moved to the intermediate position of FIG. 7. In this example, the cargo frame 30 and the cantilever frame 34 slide rearward relative to the anchor frame 38 and the general orientation of the vehicle 14 when the rack assembly 10 has moved from the stowed position to intermediate position.

From the intermediate position, the actuation system 42 then slides the cargo frame 30 further rearward relative to both the anchor frame 38 and the cantilever frame 34. After sufficient relative rearward movement of the cargo frame 30, the cargo frame 30 can pivot to the loading position of FIG. 9. An aft end of the cargo frame 30, which is represented by the rear cross member 54r in this example, moves vertically downward when the cargo frame 30 pivots from the position of FIG. 8 to the loading position of FIG. 9. Generally, the pivoting begins after a center of gravity of the cargo frame 30 and the cargo 10 moves rearward past the cantilever frame 34. The actuation system 42 moves the cargo frame 30 rearward an amount that is sufficient for the cargo frame 30 to clear the vehicle 10 when pivoting.

A pair of drive links 90 couple the cargo frame 30 to the cantilever frame 34. As will be explained, first ends of the drive links 90 have their movement constrained by the cantilever frame 30 such that the drive links 90 can slide and pivot relative to the cantilever frame 30. The first ends can attach to wheels, for example, that slide within respective slots of the cantilever frame 30. The first ends of the drive links 90 can pivot relative to the wheels. The first ends of the drive links 90 can slide with the wheels relative to the cantilever frame 34. Opposite, second ends of the drive links 90 can be pivotably coupled to the cargo frame 30.

With reference now to the schematic views FIGS. 10-17, the actuation system 42 is a cable drive system that includes, in the exemplary non-limiting embodiment, a motor 70, a drive rod 74, a drive hub 78, a cable 82, pulleys 86a-86d, and the drive link 90. The drive rod 74, the drive hub 78, the cable 82, and the pulleys 86a-86d are associated with the driver side rails 46d, 50d, and 58d of the rack assembly 10. Another drive rod 74' that is driven by the motor 70 extends to a drive hub, a cable, pulleys, and drive link on the passenger side to drive the rails 46p, 50p, and 58p (FIGS. 6-9). These components to drive the rails 46p, 50p, and 58p are not shown in FIGS. 10-17.

The motor 70 can be powered by wired port that is accessed from within the roof rack of the vehicle. The motor 70 is an example type of actuator. In another example, the motor 70 is replaced by another type of actuator.

A first end of the cable 82 is attached to the drive link 90. From the first end, the cable 82 is routed through the pulleys 86a-86d and about the drive hub 78. An opposite end of the cable 82 is also attached to the drive link 90. The routing of the cable 82 provides a mechanical advantage when moving the cargo frame 30 and particularly when pivoting the cargo frame 30.

When transitioning the rack assembly 10 back and forth between the stowed position and the loading position, the motor 70 drives the drive rods 74 and 74' together. Rotation in a first direction transitions the rack assembly 10 from the stowed position to the loading position. Rotation in an opposite, second direction transitions the rack assembly 10 from the loading position to the stowed position. The motor 70 can drive the drive rods 74, 74' in response to a command from, for example, a key fob, a synced smart phone, or a command sent from the vehicle.

For drawing clarity, the components of the rack assembly 10 in FIGS. 10-17 are shown offset from one another. The sliding characteristics of the cantilever frame 34 and cargo frame 30 are represented in schematic form by rollers R1-R4.

The pulleys 86a-86d, in the exemplary non-limiting embodiment, are rotatably mounted to the driver side rail 58d of the cantilever frame 34. To move the rack assembly 10 from the stowed position of FIG. 10 to the position of FIG. 11, the motor 70 rotates the drive rod 74 to rotate the drive hub 78 in a direction D.

Figure 10:
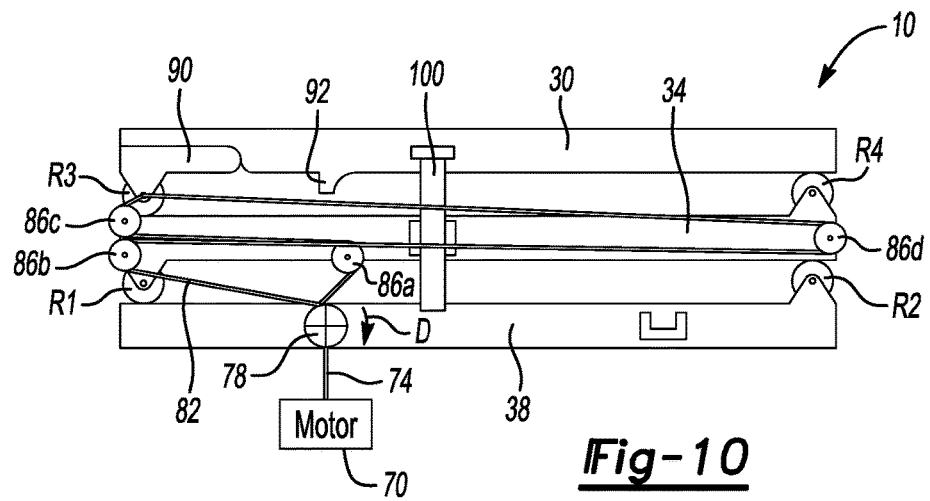
FIGS. 10-17 illustrate selected portions of an actuation system that moves the rack assembly back and forth between the stowed and loading positions.
Figure 11:
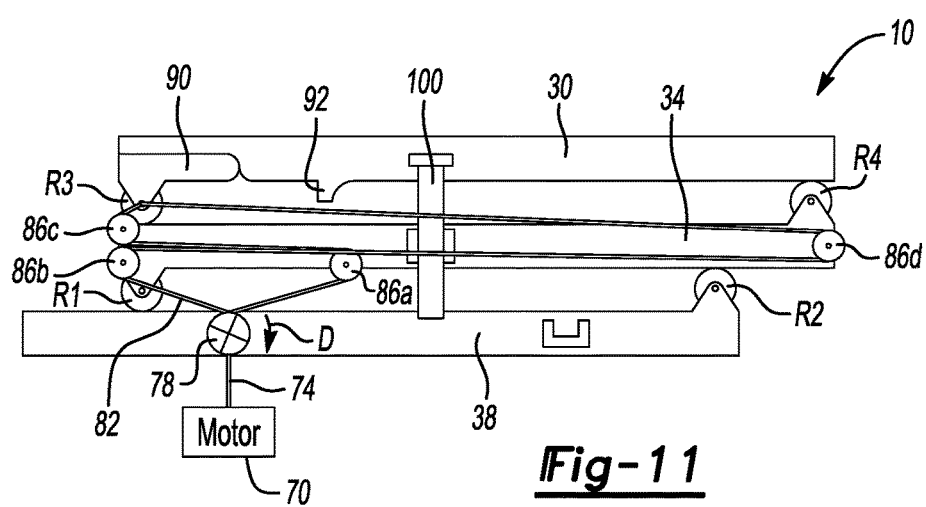

From the stowed position of FIG. 1, the rotation of the drive hub 78 in the direction D winds a portion of the cable 82 located between the pulley 86b and the drive rod 74 in FIG. 10 about the drive rod 74. The rotation of the drive hub 78 in the direction D also unwinds a portion of the cable 82 from the drive rod 74 located between the pulley 86a and the drive rod 74 from the drive rod 74. The rotation of the drive hub 78 in the direction D pulls the cable 82 causing the cantilever frame 34 and cargo frame 30 to slide rearward relative to the anchor frame 38 from the position of FIG. 10 to the position of FIG. 11. The drive rod 74 can be helical to keep the unwinding portion of the cable 82 separate from the winding portion of the cable 82.

Figure 12:
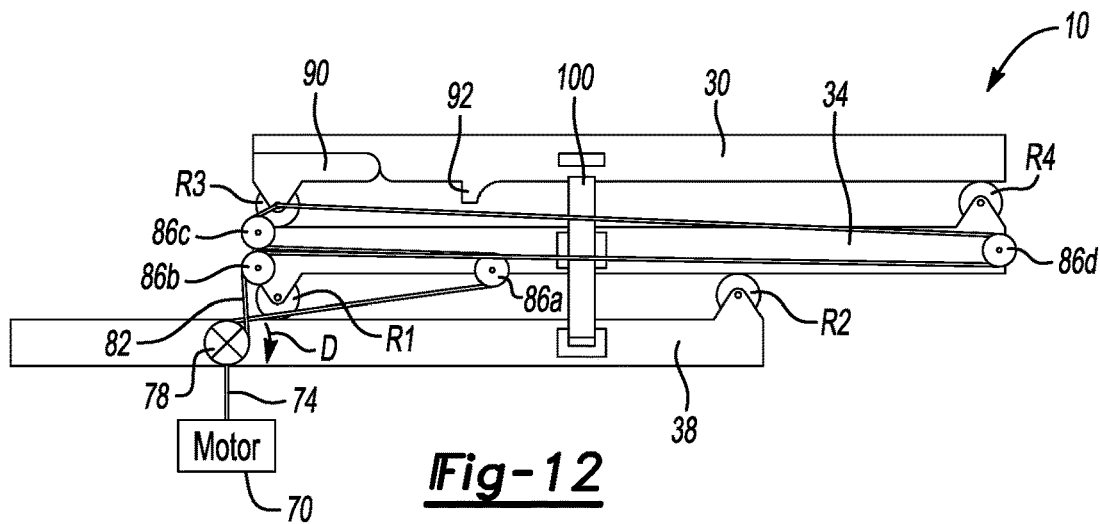
Figure 13:
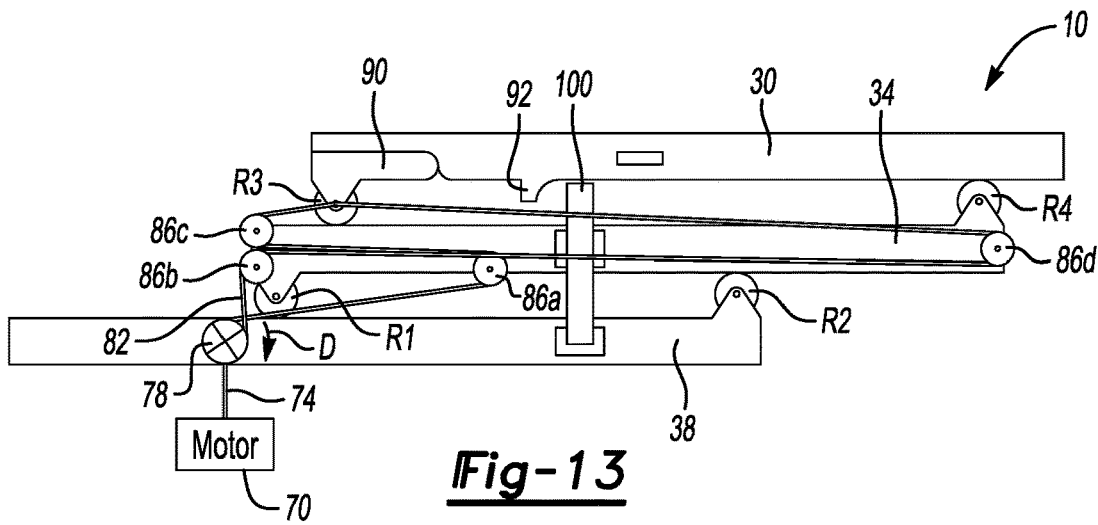

Continuing to rotate the drive hub 78 with the drive rod 74 then moves the cargo frame 30 further rearward relative to the cantilever frame 34 until the rack assembly 10 is in the intermediate position of FIGS. 12 and 13. At this position, a lock assembly 100 transitions from an unlocked position shown in FIG. 12 to a locked position shown in FIG. 13. When the lock assembly 100 is in the unlocked position, the cantilever frame 34 can slide rearward relative to the anchor frame 38. When the lock assembly 100 is in the unlocked position, rearward movement of the cantilever frame 34 relative to the anchor frame 38 is blocked.

Figure 14:
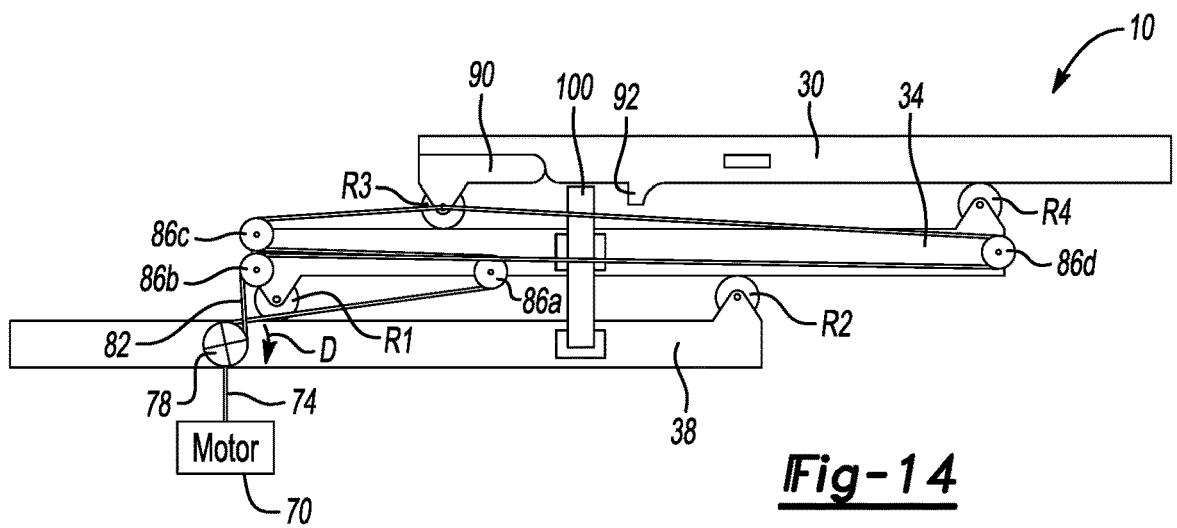
Figure 15:
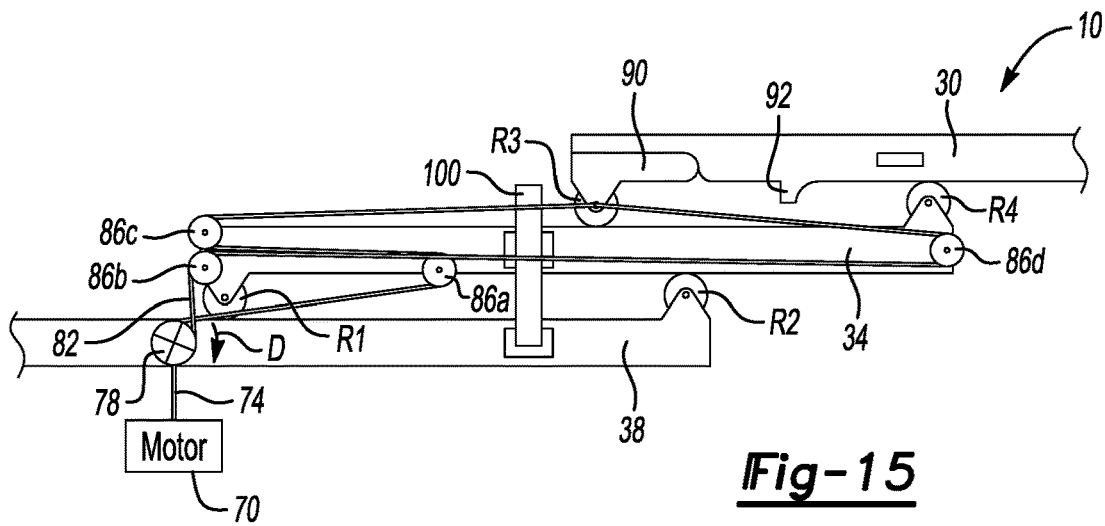

After the lock assembly 100 has transitioned to the locked position as shown in FIG. 13, continued rotation of the drive hub 78 in the direction D slides the cargo frame 30 rearward relative to the cantilever frame 34 as shown in FIGS. 14 and 15. The cable 82 is coupled to the drive link 90, which is coupled to the cargo frame 30. The continued rotation of the cable 82 in the direction D causes the cable 82 to pull against the drive link 90 to pull the cargo frame 30 rearward relative to the cantilever frame 34.

Figure 16:
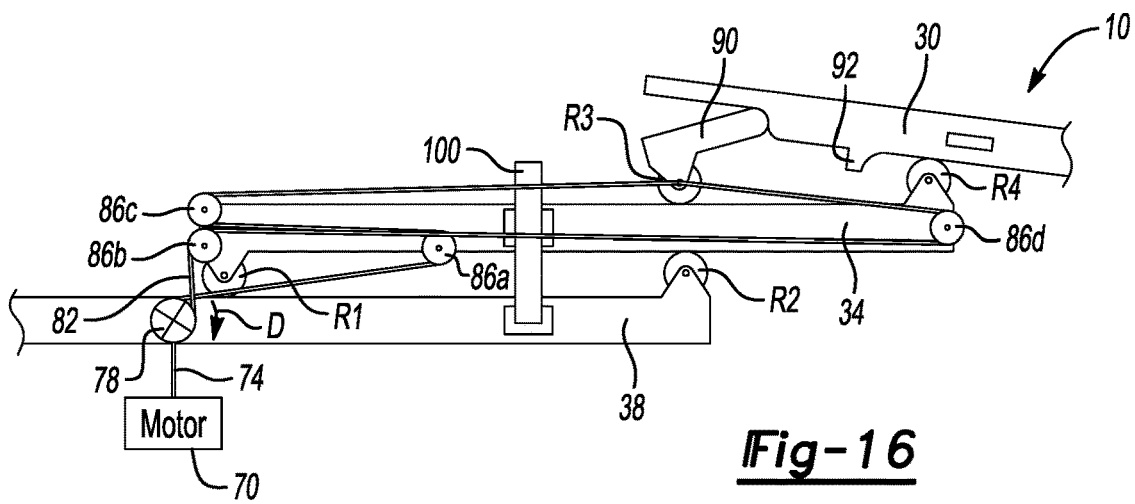

After moving sufficiently rearward, a center of gravity of the cargo frame 30 together with any cargo 18 mounted to the cargo frame 30, passes rearward over an aft end of the cantilever frame 34. This causes the cargo frame 30 to begin to pivot relative to the cantilever frame 34 about the aft end of the cantilever frame 34 as shown in FIG. 16. The cargo frame 30 continues to pivot until reaching the loading position of FIG. 17 where a stop 92 of the cargo frame 30 contacts a portion of the cantilever frame 34.

The drive link 90 is coupled to a forward end of the cargo frame 30 and slidably coupled to the cantilever frame 34. The drive link 90 pivots relative to the cargo frame 30 as the cargo frame 30 pivots relative to the cantilever frame. The drive link 90 and cable 82 can help to control the pivoting of the cargo frame 30.

Figure 17:
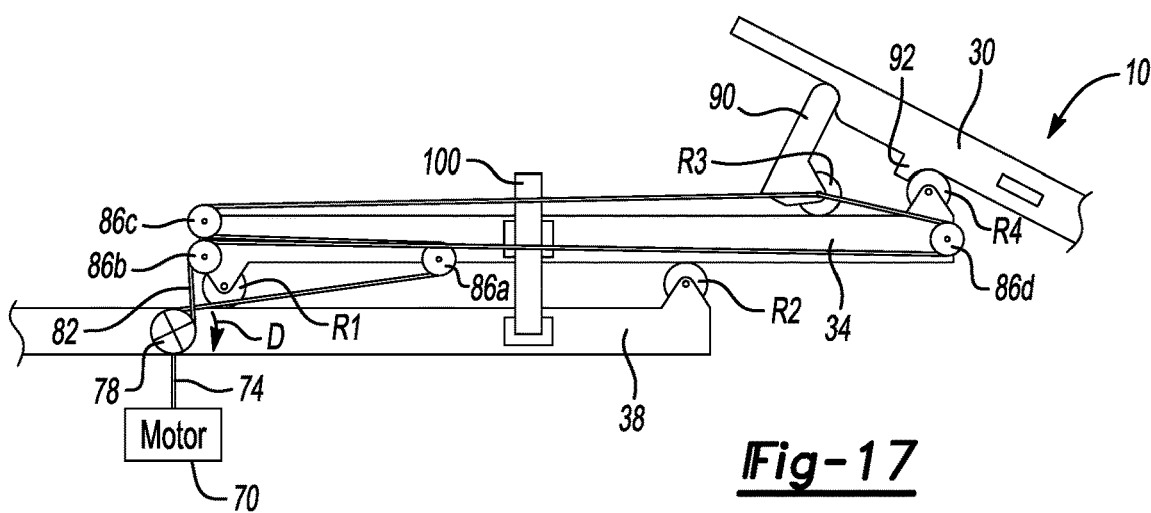

To transition the cargo frame 30 from the loading position of FIG. 17 back to the stowed position of FIG. 10, the motor 70 is rotated in a direction opposite the direction D.

Figure 18:
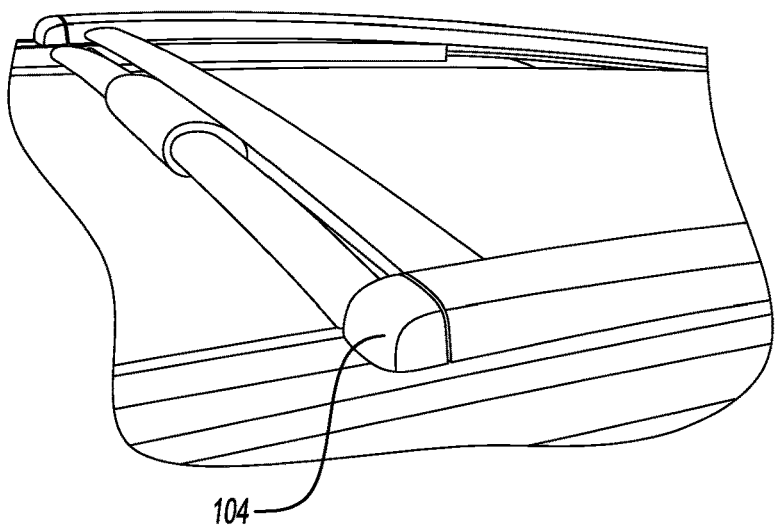
FIG. 18 illustrates a perspective view of selected portions of the rack assembly when the rack assembly is between the stowed position and the intermediate position.
Figure 19:
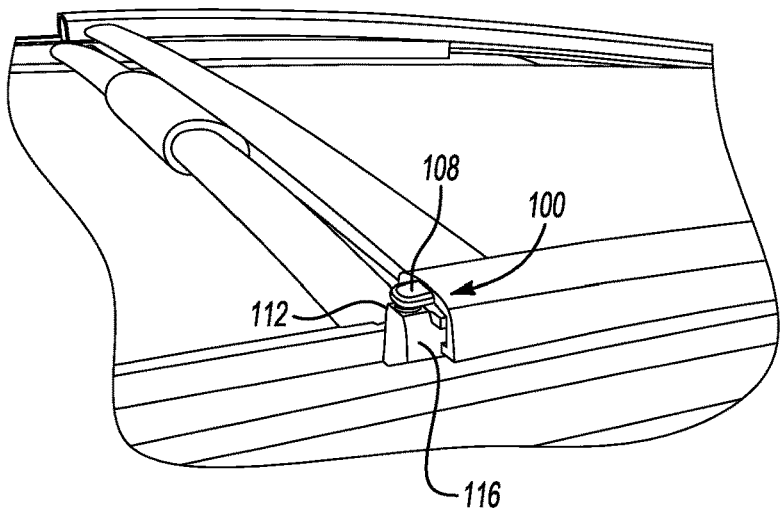
FIG. 19 illustrates the view of FIG. 18 with a cap removed to reveal a lock assembly in an unlocked position.
Figure 20:
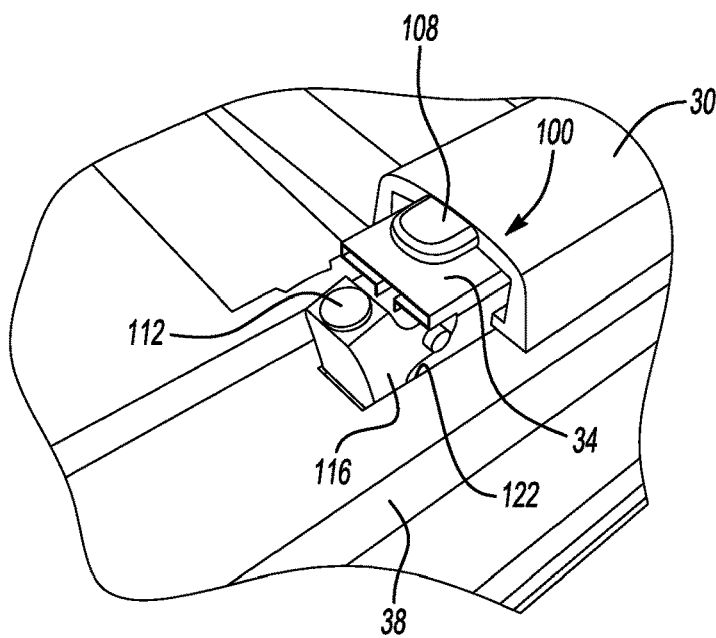
FIG. 20 illustrates the lock assembly of FIG. 19 when the rack assembly has transitioned further from the stowed position such that the lock assembly has transitioned from the unlocked position to a locked position.

With reference now to FIGS. 18-20, the lock assembly 100, again, can be used to block movement of the cantilever frame 34 relative to the anchor frame 38 when transitioning between the intermediate position and the loading position. While the actuator system 42 can somewhat move the anchor frame 38 relative to the cantilever frame 34 without the lock assembly 100, the lock assembly 100 stabilizes the movements. Other examples, however, could omit the lock assembly 100.

In FIG. 18, a cap 104 covers the lock assembly 100. The cap 104 is removed in FIG. 19 to reveal the lock assembly 100, which is shown in an unlocked position. A tab 108 that moves with the cargo frame 30 is magnetically coupled to a pad 112 of the lock assembly 100 when the lock assembly is in the unlocked position.

The pad 112, in the exemplary non-limiting embodiment, is mounted to a latch 116 that is pivotably coupled to the cantilever frame 34 and moves with the cantilever frame when the rack assembly 10 moves between the loading position and the stowed position.

The tab 108, the pad 112, or both, could be magnetized to provide the magnetic coupling between the latch 116 and the tab 108. Provided the tab 108 and the pad 112 remain in close proximity to one another, the magnetic attraction holds the latch 116 in the unlocked position of FIG. 19.

Transitioning the cargo frame 30 rearward relative to the cantilever frame 34 causes the tab 108 to separate from the pad 112, which disrupts the magnetic coupling. The latch 116 then pivots relative to the cantilever frame into a notch 122 of the anchor frame 38. When the latch 116 is positioned within the notch 122, rearward movement of the cantilever frame 34 relative to the anchor frame 38 is blocked.

When transitioning the cargo frame 30 back from the loading position back to the stowed position, the cargo frame 30 moves forward relative to the cantilever frame 34 until the tab 108 is again aligned with the pad 112. The magnetic attraction between the tab 108 and the pad 112 pivots the latch 116 away from the notch 122 to transition the lock assembly 100 from the locked position to an unlocked position, which permits the cantilever frame 34 to then move forward with the cargo frame 30 to the stowed position.

Generally, movement of the cargo frame 30 from the stowed position of FIG. 10 to the loading position of FIG. 17 can be summarized as follows. First, as the motor 70 begins a clockwise rotation in the direction D, the drive hub 78 winds up some of the cable 82 between the drive hub 78 and the pulley 86b mounted to the forward end of the cantilever frame 58. During this movement, the cantilever frame 58 and the cargo frame 50 can be relatively gently held together by the locking assembly 100 (FIGS. 19 and 20), which can be a magnetic or mechanical catch. The cantilever frame 58 and the cargo frame 50 can thus transition together as a singular unit. During this movement, the cable 82 unwinds toward the pulley 86a, which can be mounted on the mid-section of the cantilever frame 58 at a distance to pulley 86b nominally equal to the travel required of the cantilever frame 58 to clear the rearmost portion of the vehicle 14 (FIGS. 1-9).

The cantilever frame 58 and cargo frame can travel rearward via rollers R1-R4. The roller R1 can be constricted in tracks designed into the anchor frame 46. The roller R2 can be constricted in tracks designed into the cantilever frame 58d. The rollers R1-R4 are not shown as constricted in FIGS. 10-17 for drawing clarity.

As the pulley 86b moves rearward past the hub drive 78 to the position of FIG. 12, the cantilever frame 58 and the cargo frame 50 are no longer moved rearward together as the horizontal force component is lost. This is due to the now vertical disposition of the cable 82 between the drive hub 78 and pulley 86b. Notably, the distance between the drive hub 78 and a forward end of the anchor frame 38 can be nominally the same as the distance between the pulleys 86a and 86b. This distance controls how far the cantilever frame 34 extends rearward.

The drive hub 78 then continues to rotate in the direction D and the cable 82 continues to wind about the drive hub 78. This causes the cable 82 to pull on the roller R3, which is attached to the forward end of drive link 90.

Because the cable 82 is doubled back around the pulley 86d, which is mounted towards the rear of the cantilever frame 34, the pulling force exerted on the roller R3 is effectively doubled. This facilitates the cargo frame 30 overcoming the holding force of the locking assembly 100 and moves the cargo frame 30 rearward relative to the cantilever frame 34.

The locking assembly 100 then transitions to a locked position in response to, for example, a force of gravity and/or spring force, to engage a pawl to couple together the cantilever frame 34 and the anchor frame 38.

The cable 82 then continues to pull the cargo frame 30 rearward. The cargo frame 30 is at least partially supported by the roller R4 mounted at the rear end portion of the cantilever frame 34.

At some point along its rearward travel, the balance point of the cargo frame 30 and whatever cargo load is supported by the cargo frame 30 passes rearward past the roller R4. Roller R4 then becomes a fulcrum, balancing between gravity acting on the cargo frame 30 with any cargo load, and the hinge point between the drive link 90 and the cargo frame 30. The drive link 90 can be restricted from vertical movement due to the roller R3 being constricted in a channel designed into the cantilever frame 34.

At a point determined by the geometry of various dimensions for a given installation of this system, the cargo frame 30 movement causes the stop 92, which may be disposed within a channel of the cargo frame 30, to contact the roller R4 and thereby constrict rotation of the roller R4.

The continued rotation of drive hub 78 causes the cable 82 to now pulls the roller R3 rearward, which increasing the angle between the drive link 90 and the cargo frame 30. This raises a rear portion of the cargo frame 30 vertically higher, and tips a rear end portion of the cargo frame 30 further downward over a rear of the vehicle 14.

The motor 70 can then stop rotating the drive hub 78 to arrest travel and angle by means of positional switch, stepper function or user adjustment. The cargo frame 30 is then stable and locked, and ready for loading or unloading.

The motion to bring the cargo frame 30 back to stowed position simply requires the motor 70 to reverse (counterclockwise) rotation of the drive hub 78. With reference to FIG. 17, the cable 82 notably doubles back twice before pulling on the roller R3. This can provide three times the mechanical advantage to the drive hub 78 to pull the now (possibly heavily loaded) cargo frame 30 back to the intermediate position. Initially, from the position of FIG. 17, counterclockwise rotation of the drive hub 78 causes the cargo frame 30 to rotate about the roller R3 and change the able of the cargo frame 30 relative to the cantilever frame 34.

The cargo frame 30 is then retracted as the cable 82 winds around pulleys 86a, 86c, which pulls the roller R3. The cargo frame 30 is retracted until the locking assembly 100 is aligned as shown in FIG. 12. This transitions the locking assembly 100 to the unlocked position. The transition can be due to magnetic force or a mechanical unloading.

The cargo frame 30 and cantilever frame 34 are then pulled together by the cable 82 until the cable 82 has pulled the roller R3 to the end of its travel just rearward of pulley 86c. The rotation of the drive hub 78 then causes the cable 82 to pull against the pulley 86a such that the cantilever frame 34 and cargo frame 30 are moved together to the position of FIG. 10 where the rack assembly 10 is in the stowed position.

In the stowed position, the pulley 86a is once again substantially vertically above the drive hub 78 such that a relatively small forward component of force remains as the cantilever frame 34 comes to the end of its track in the anchor frame 30. The motor 70 can then stop by stepper function to stop rotation of the drive hub 78. The rack assembly is 10 then secure in the stowed position due to the locked motor 70 and friction of cable 82 against guides (e.g., helical guides) of the drive hub 78.

Figure 21:
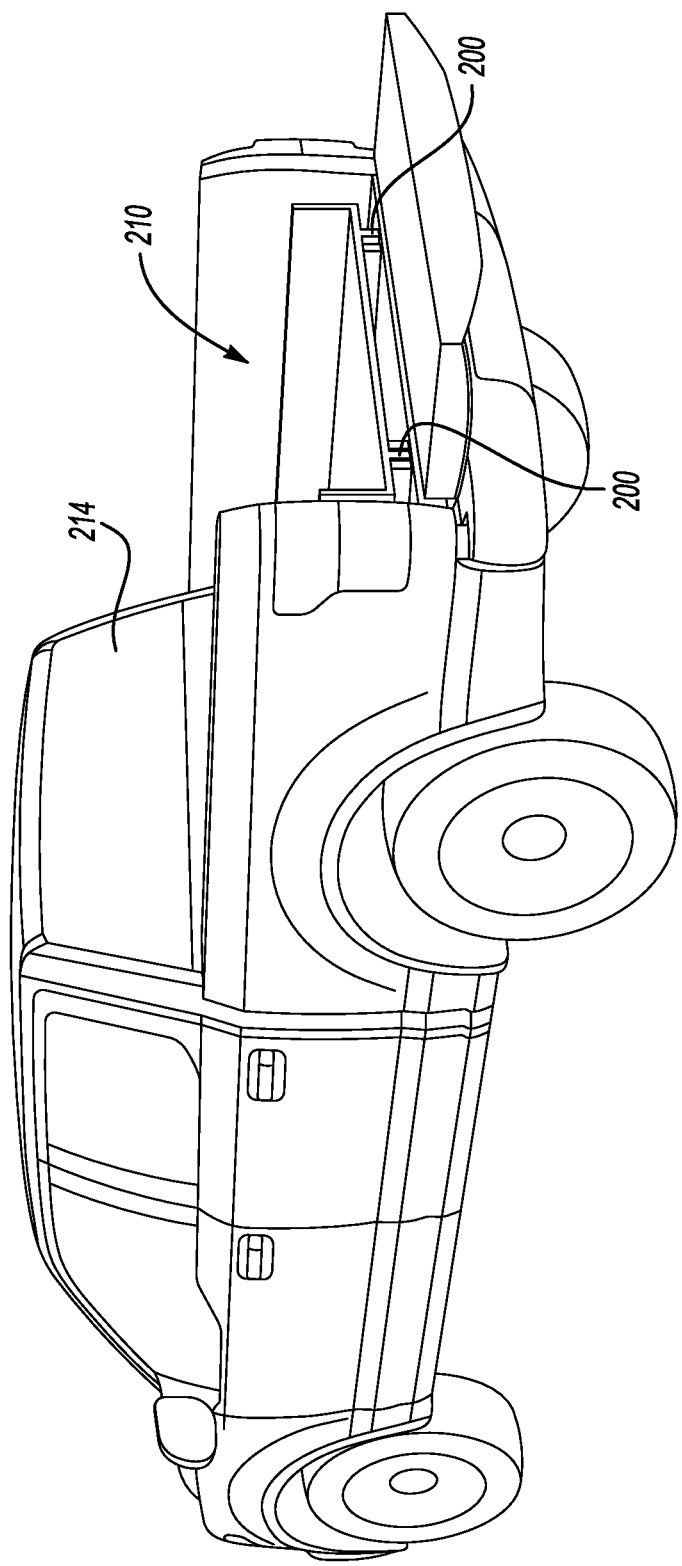
FIG. 21 illustrates another example rack assembly mounted to a cargo bed of a vehicle and in a stowed position.
Figure 22:
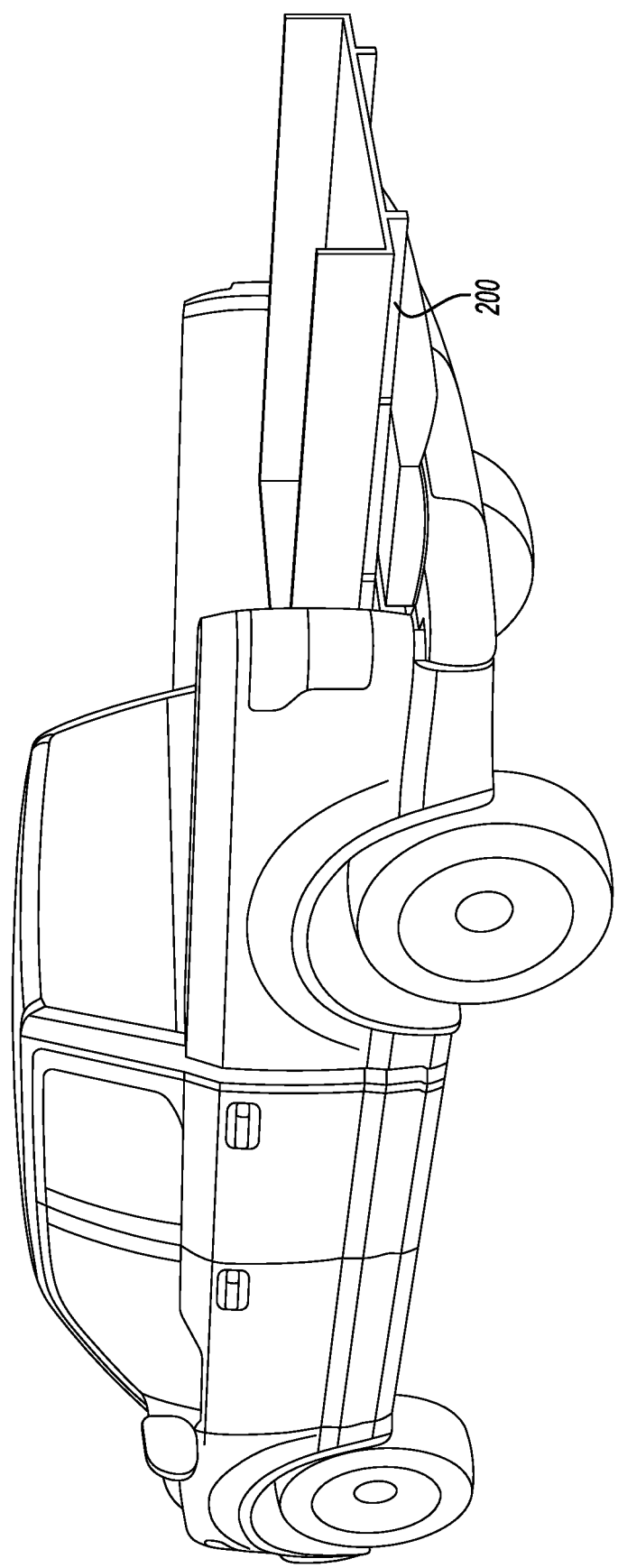
FIG. 22 illustrates the rack assembly of FIG. 21 in an intermediate position.
Figure 23:
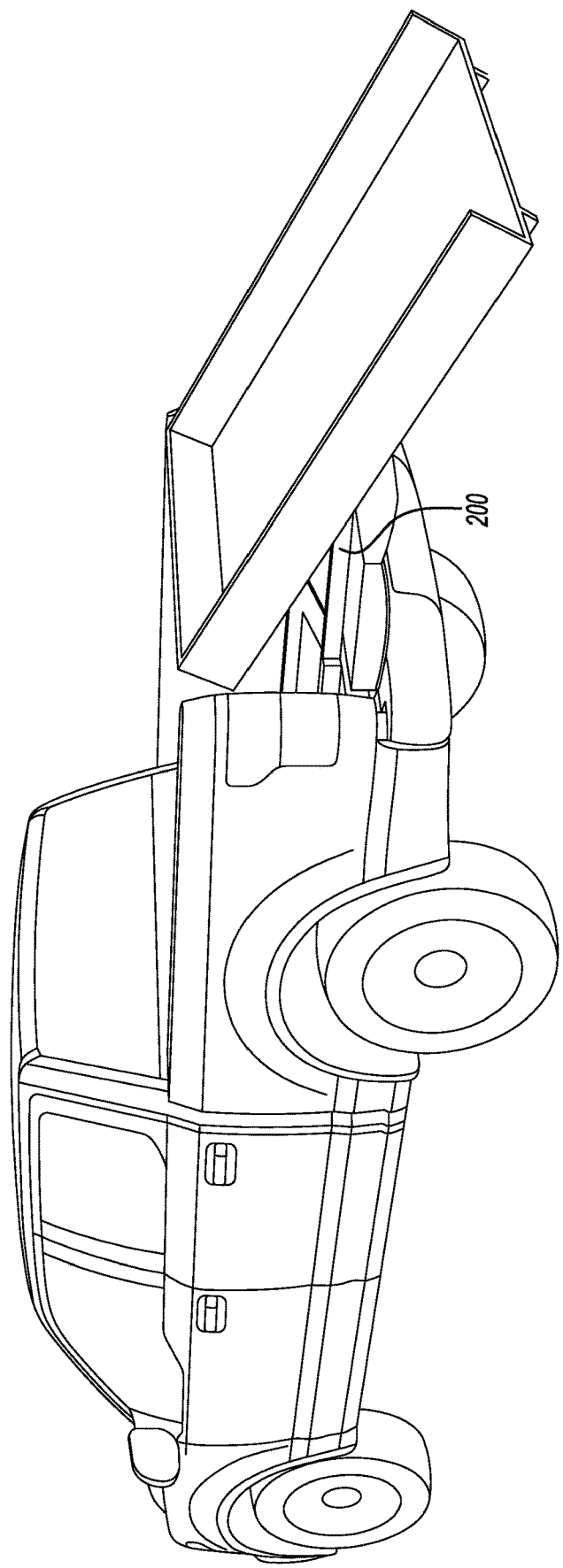
FIG. 23 illustrates the rack assembly of FIG. 21 in a loading position.

As shown in FIGS. 21-23, a rack assembly 200 is similar to the rack assembly 10, shown in connection with the embodiment of FIGS. 1-20. The rack assembly 200, however, includes an anchor frame mounted to a cargo bed area 210 of a pickup truck 214 type of vehicle. The rack assembly 200 can transition between the stowed position of FIG. 21 and a loading position of FIG. 23 in a manner similar to the rack assembly 10 of FIGS. 1-20.

Thus, exemplary embodiments of the frame assemblies of this disclosure could be used to mount cargo to a roof of a vehicle. Other exemplary embodiments could be used to mount cargo another area of a vehicle, such as a cargo bed.

Further, although the example frame assemblies 10, 200 are depicted as transitioning cargo rearward relative to the vehicle when transitioning from a stowed position to a loading position, other examples could transition the frame in other directions from the stowed position to the loading position, such as to a lateral side of a vehicle, or to a forward end of a vehicle.

Features of the disclosed examples include a cargo frame that incorporates an actuation system to transition a load back and forth between a loading position and a storage position which can facilitate loading and unloading cargo from the cargo frame. The actuation system can, in some examples, require only a single motor or drive mechanism that can drive pulley systems on both the passenger and driver side of a vehicle.

In the exemplary non-limiting embodiment described in connection with FIGS. 1-20, a single motor drives the two drive rods. In other exemplary embodiments, two separate motors could be used to transition the rack assembly back and forth between the stowed position and the loading position. One motor could, for example, be associated with the passenger side of the rack assembly, and the other motor associated with the driver side of the rack assembly. The two motors can be synced electrically so that the motors work together to transition the rack assembly.

The two motor variation may be particularly appropriate for the rack assembly that is anchored within a cargo bed of a pickup truck, such as the rack assembly of the FIGS. 21-23 embodiment. Utilizing two motors can be, in some examples, useful when the cargo carried by the rack assembly is relatively heavy. Motorcycles, for example, can be supported by a rack assembly anchored within a cargo bed and may be relatively heavy when compared to cargo typically supported by rack assemblies anchored to a vehicle roof.

Other variations of the rack assembly that could facilitate carrying relatively heavy cargo could include positioning the motor and cable system in the center of the rack assembly, and connecting the rollers on the passenger side and driver side of the rack assembly with cross-members that act as the structural cross bars. The cargo frame could also be changed to include a platform extending from the passenger to the driver side. The platform could include tie down anchors. The platform could look similar to the cargo bed floor to which the rack assembly is anchored.

Additionally, for the rack assemblies of this disclosure, the placement of the actuator (e.g., motor) and pulley 86a can determine the distance that the cantilever frame 34 travels before stopping and establishing the fulcrum about which the cargo frame 30 pivots. On the cargo frame 30, the placement of the stop block 92 and the length of the drive link 90 can determine the loading angle when the rack assembly is in fully extended to the loading position. It can be appreciated that on a pick-up truck with a long cargo bed not too far off the ground, the final angle of the cargo frame will be shallow compared to rack assembly anchored to a short roof of a tall SUV. Also, allowing for some fine adjustments to the final angle when the rack assembly is in the loading position could aid in loading, for example, long kayaks on a rack assembly anchored to a roof of an SUV or a motorcycle onto a rack assembly anchored to cargo bed of a pick-up.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A rack assembly, comprising:
a cargo frame;
a cantilever frame; and
a cable drive system that moves the cargo frame from a stowed position to an intermediate position by sliding the cargo and cantilever frames relative to an anchor frame, and that moves the cargo frame from the intermediate position by sliding the cargo frame relative to the cantilever frame to permit pivoting of the cargo frame relative to the cantilever frame to a loading position.

2. The rack assembly of claim 1, further comprising the anchor frame secured directly to roof rails of a vehicle.

3. The rack assembly of claim 1, further comprising the anchor frame secured directly to a cargo bed of a vehicle.

4. The rack assembly of claim 1, wherein the cargo frame is configured to support cargo such that the cargo is coupled in movement together with the cargo frame.

5. The rack assembly of claim 1, further comprising cables of the cable drive system, the cables sliding the cargo frame when moving the cargo frame from the stowed position to the loading position.

6. The rack assembly of claim 1, further comprising a lock assembly that transitions between an unlocked position and a locked position, the lock assembly in the unlocked position permitting movement of the cantilever frame relative to the anchor frame as the cargo frame is moved from the stowed position to the intermediate position, the lock assembly in the locked position block movement of the cantilever frame relative to the anchor frame as the cargo frame is moved from the intermediate position to the loading position.

7. The rack assembly of claim 6, wherein the lock assembly includes a latch that pivots in response to movement of the cantilever frame relative to the anchor frame, the pivoting to transition the lock assembly between the unlocked position and the locked position, the latch withdrawn from a notch when the lock assembly is in the unlocked position, the latch at least partially received within the notch when the lock assembly is in the locked position.

8. The rack assembly of claim 1, wherein the cable drive system moves the cargo frame from the loading position to the intermediate position by sliding the cargo frame relative to the cantilever frame and by pivoting the cargo frame relative to the cantilever frame, wherein the cable drive system moves the cargo frame from the intermediate position to the stowed position by sliding the cargo and cantilever frames relative to the anchor frame.

9. The rack assembly of claim 1, wherein sliding the cargo and cantilever frames relative to the anchor frame to move the cargo frame from a stowed position to an intermediate position extends an end portion of the cargo frame away from the anchor frame, and pivoting the cargo frame when moving the cargo frame from the intermediate position to the loading position moves the end portion of the cargo frame vertically downward.

10. A rack assembly, comprising:
a cargo frame;
a cantilever frame; and
an actuation system that moves the cargo frame from a stowed position to an intermediate position by sliding the cargo and cantilever frames relative to an anchor frame, and that moves the cargo frame from the intermediate position by sliding the cargo frame relative to the cantilever frame to permit pivoting of the cargo frame relative to the cantilever frame to a loading position,
wherein the actuation system includes a first cable, a second cable, and an actuator,
the actuator configured to move the first cable to slide a first rail of the cargo frame and a first rail of the cantilever frame when moving the cargo frame from the stowed position to the loading position,
the actuator configured to move the second cable to slide a second rail of the cargo frame and a second rail of the cantilever frame when moving the cargo frame from the stowed position to the loading position.

11. The rack assembly of claim 10, wherein the actuator is a motor configured to rotate drive rods to move both the first and the second cables.

12. The rack assembly of claim 11, wherein the motor is disposed between the first rails and the second rails of the cargo and cantilever frames.

13. A rack accessing method, comprising:
sliding a cargo frame and a cantilever frame relative to an anchor frame to move the cargo frame from a stowed position to an intermediate position; and
using a cable drive system, sliding the cargo frame relative to the cantilever frame to permit pivoting the cargo frame relative to the cantilever frame to move the cargo frame from the intermediate position to a loading position.

14. The rack accessing method of claim 13, wherein the anchor frame is secured to a vehicle during the sliding.

15. The rack accessing method of claim 13, further comprising supporting cargo with the cargo frame such that the cargo moves with the cargo frame between the stowed and loading positions.

16. The rack accessing method of claim 13, further comprising using a motor to drive a first cable to slide a first rail of the cargo frame and a first rail of the cantilever frame when moving the cargo frame from the stowed position to the loading position, and using the motor to drive a second cable to slide a second rail of the cargo frame and a second rail of the cantilever frame when moving the cargo frame from the stowed position to the loading position.

17. The rack accessing method of claim 13, further comprising moving the cargo frame from the loading position to the intermediate position by sliding the cargo frame relative to the cantilever frame and pivoting the cargo frame relative to the cantilever frame, and moving the cargo frame from the intermediate position to the stowed position by sliding the cargo and cantilever frames relative to the anchor frame.

18. The rack accessing method of claim 13, further comprising extending an end portion of the cargo frame away from a vehicle when sliding the cargo and cantilever frames relative to the anchor frame to move the cargo frame from a stowed position to an intermediate position, and moving the end portion of the cargo frame vertically downward when pivoting the cargo frame.

19. The rack accessing method of claim 13, further comprising moving the cargo frame relative to the anchor frame to transition a lock assembly from an unlocked position to a locked position, the lock assembly in the unlocked position permitting movement of the cantilever frame relative to the anchor frame as the cargo frame is moved from the stowed position to the intermediate position, the lock assembly in the locked position block movement of the cantilever frame relative to the anchor frame as the cargo frame is moved from the intermediate position to the loading position.

* * * * *